United States Patent [19]

Raj

[11] Patent Number: 5,033,788
[45] Date of Patent: Jul. 23, 1991

[54] COMBINED HARD TOP AND CONVERTIBLE TOP CAR

[75] Inventor: Joseph T. Raj, Riverview, Mich.

[73] Assignee: Evans Automotive, Division of Evans Industries Inc., Wayne, Mich.

[21] Appl. No.: 489,020

[22] Filed: Mar. 6, 1990

[51] Int. Cl.$^5$ .................................................. B60J 7/08
[52] U.S. Cl. ....................................... 296/136; 296/210
[58] Field of Search ............................... 296/136, 210

[56] References Cited

U.S. PATENT DOCUMENTS

| | | | |
|---|---|---|---|
| 2,765,192 | 10/1956 | Blake | 296/210 X |
| 3,241,877 | 3/1966 | Tate | 296/136 |
| 3,328,073 | 6/1967 | Einhorn | 296/136 |
| 4,154,473 | 5/1979 | Alexander et al. | 296/210 |
| 4,699,420 | 10/1987 | Priest et al. | 296/210 |

Primary Examiner—Margaret A. Focarino
Assistant Examiner—Andrew C. Pike
Attorney, Agent, or Firm—Barnes, Kisselle, Raisch, Choate, Whittemore & Hulbert

[57] ABSTRACT

A combined hard top and convertible top car comprises a car and a cap which has the configuration of the convertible top when the top is in up or elevated position and overlies the convertible top. The cap comprises of top wall, a rear wall, a rear wall and side walls. The cap includes front flanges along the front edge of the top wall which engage under the front edge of the convertible top, rear flanges along the rear wall which engage under the front edge of the car body adjacent the rear wall of the convertible top and side flanges along the side walls that engage the sides of the car body. The car top is applied by the successive steps of releasing the front edge of the convertible top from its point of attachment to the windshield of the car, setting the hard top in place, positioning the rear flanges below the front edge of the car body, engaging the front flanges under the front portion of the convertible top, reengaging and latching the front edge of the convertible top to the windshield thereby causing the rear flanges on the hard top to engage under a portion of the car body, and thereafter simultaneously pushing inwardly on the side walls of the hard top to engage the side flanges under side moldings of the car.

2 Claims, 4 Drawing Sheets

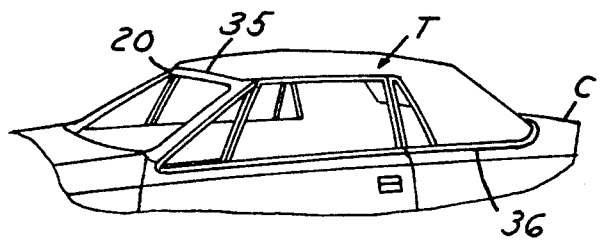
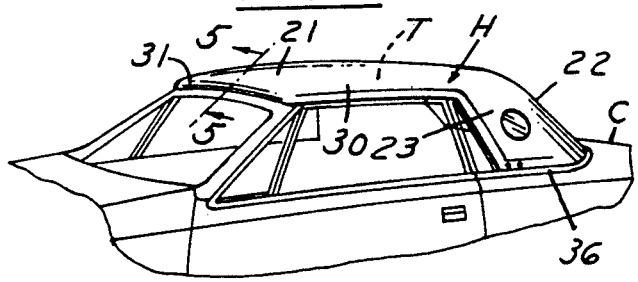
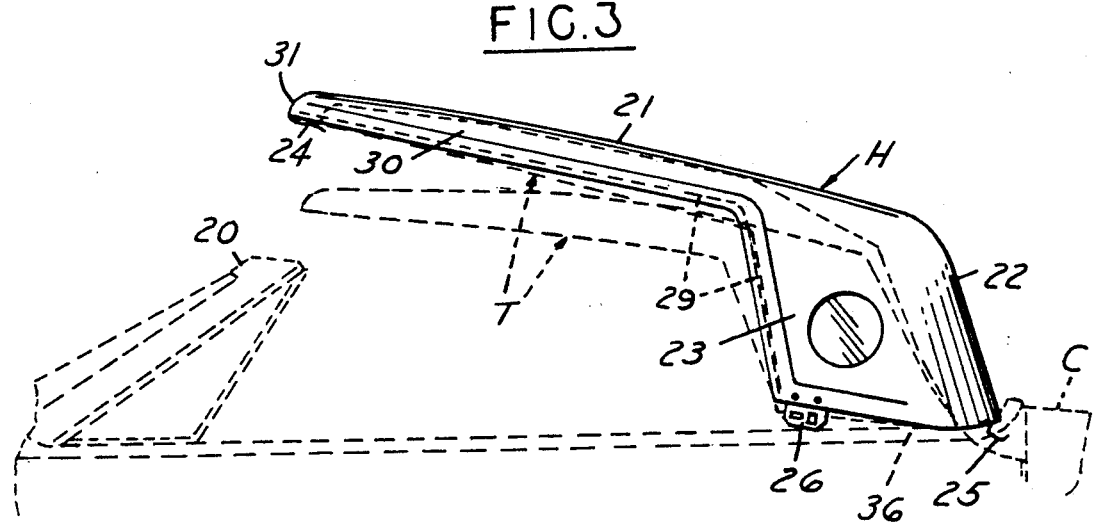

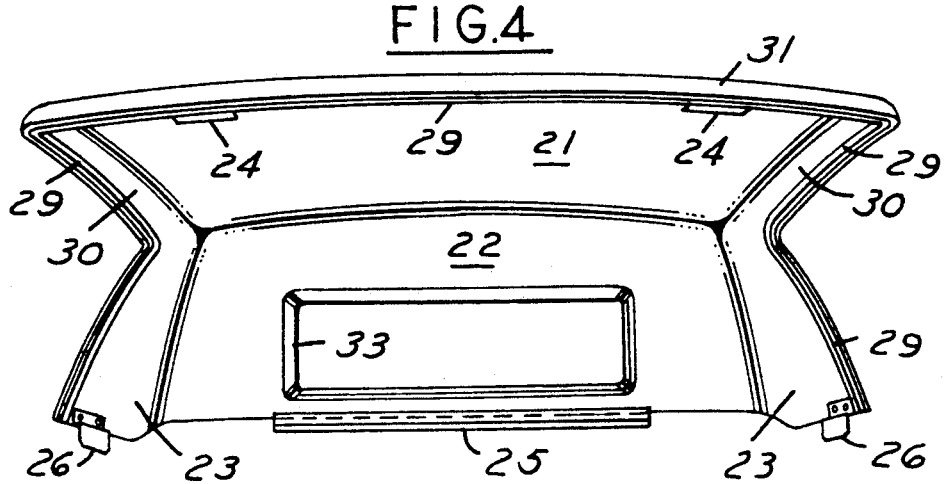
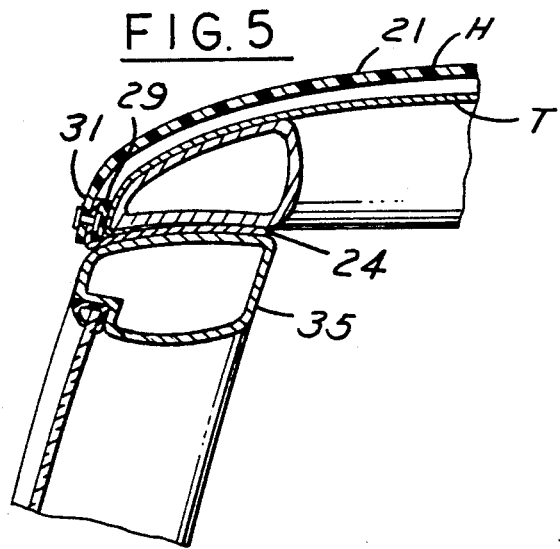
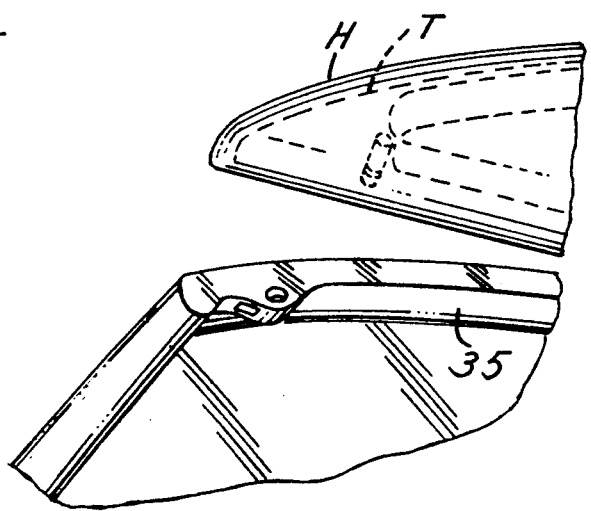
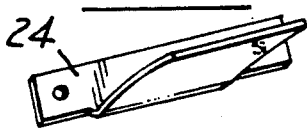
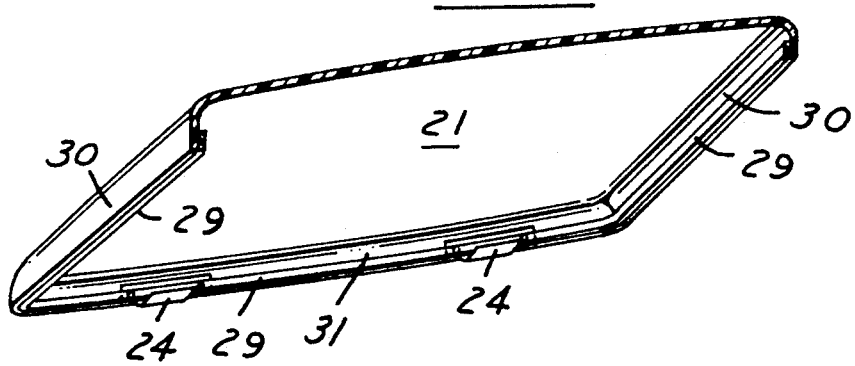

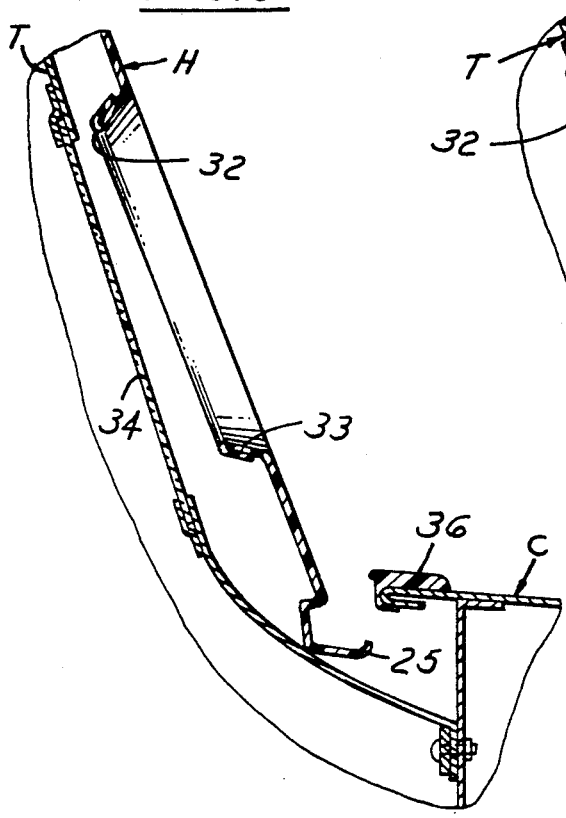
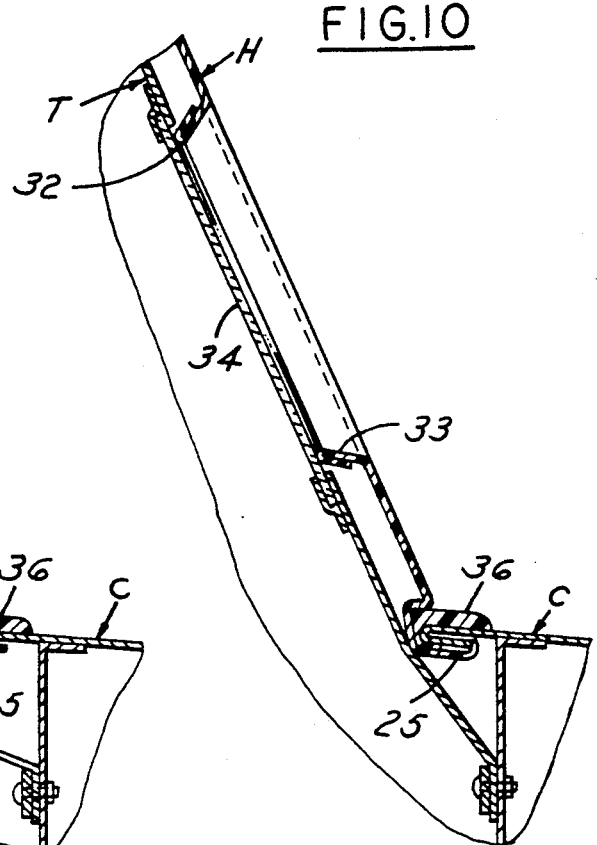
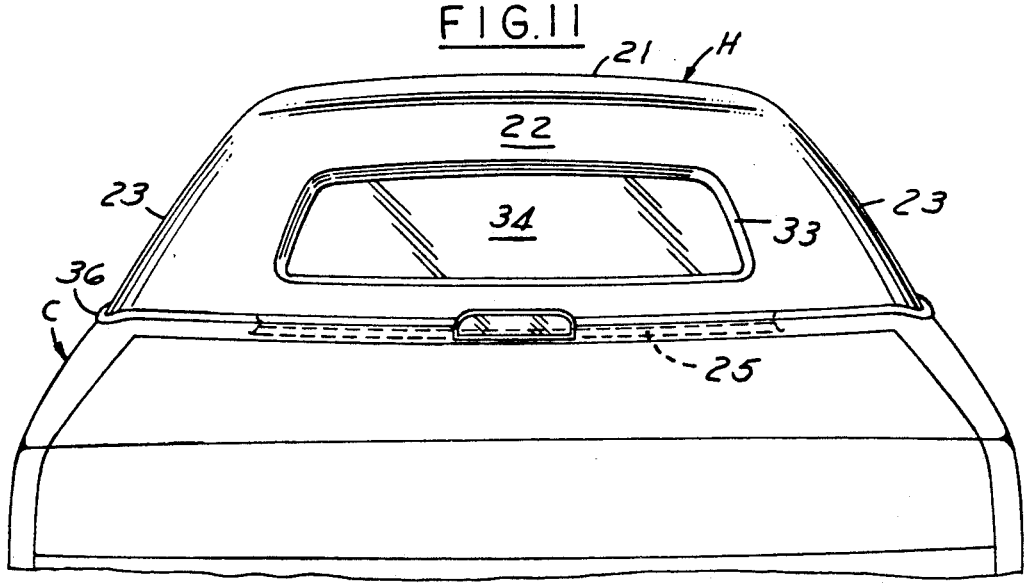

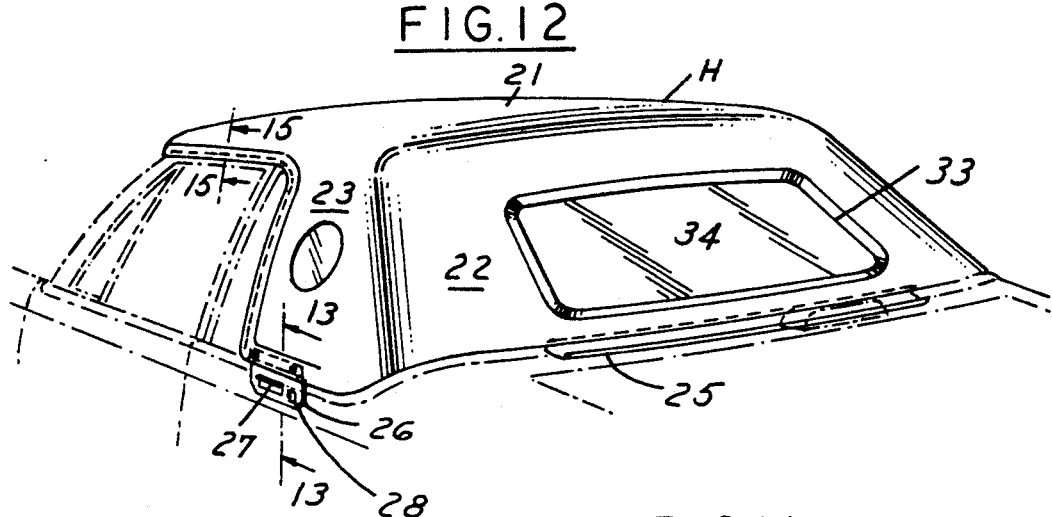
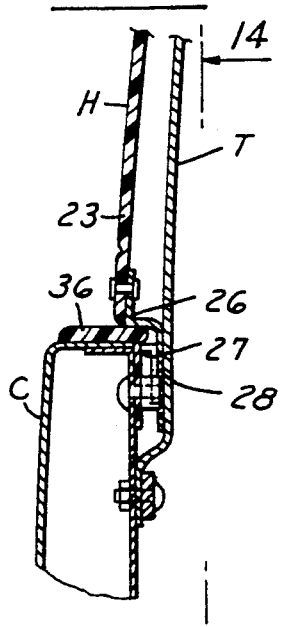
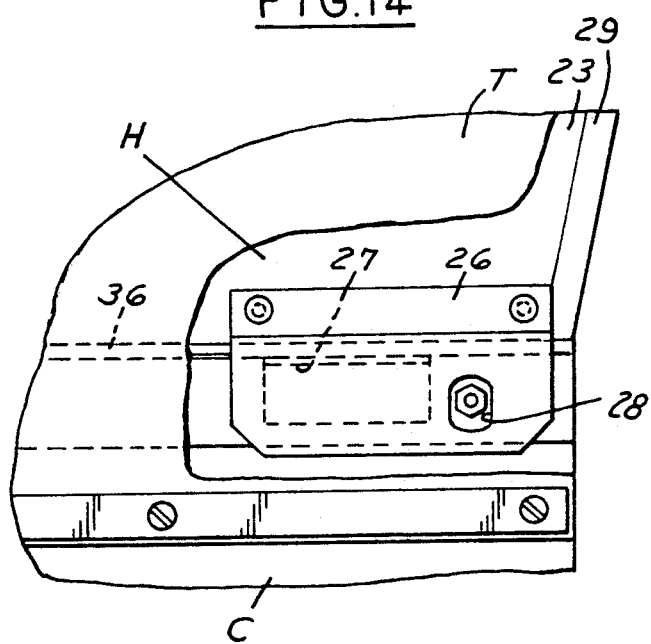
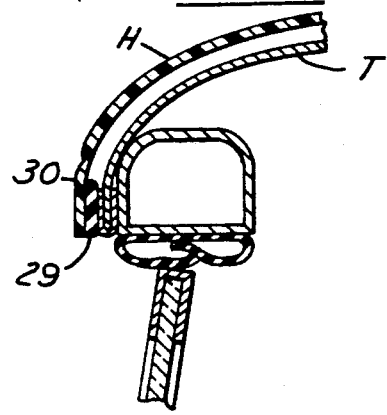

COMBINED HARD TOP AND CONVERTIBLE TOP CAR

This invention relates to convertible tops and particularly to providing a hard top on convertible top cars.

BACKGROUND OF THE INVENTION

A popular type of car is one wherein a convertible or soft top is supported by a linkage so that it can be positioned in an elevated or up position or retracted to a lower or down position. Such cars have a disadvantage in that in periods of inclement weather such as snow and cold, they are not as comfortable and the convertible top can be damaged. It has been recommended that a hard top be positioned in place of the convertible top or over the convertible top when the convertible top is lowered. Such hard tops have been found to be quite expensive and difficult to maneuver.

SUMMARY OF THE INVENTION

Among the objectives of the present invention are to provide a combined hard top and convertible car top wherein the hard top overlies the convertible top in an erected position and; wherein the same mechanism that locks the convertible top in place also locks the hard top in place; which arrangement is relatively low in cost; which provides minimum noise as in the case of a completely closed car; and which is readily adaptable to various types of convertible cars.

In accordance of the invention, a combined hard top and convertible top car comprises a cap having the configuration of the convertible top on the top is in an up or elevated position and overlying the convertible top. The cap comprises of top wall, a rear wall and side walls. The cap includes front flanges along the front edge of the top wall which engage under the front edge of the convertible top, rear flanges along the rear wall which engage under the front edge of the car body adjacent the rear wall of the convertible top and side flanges along the side walls that engage the sides of the car body. The car top is applied by the successive steps of releasing the front edge of the convertible top from its point of attachment to the windshield of the car, setting the hard top in place, positioning the rear flanges below the front edge of the car body, engaging the front flanges under the front portion of the convertible top, reengaging and latching the front edge of the convertible top to the windshield thereby causing the rear flanges on the hard top to engage under a portion of the car body, and thereafter simultaneously pushing inwardly on the side walls of the hard top to engage the side flanges under side moldings of the car. The hard top is preferably made by compression molding plastic and glass fibers to form a top with the final desired shape and with a finish comparable to that of the remainder of the car so that it can be painted and baked, if desired, to conform with the finish of the car and, optionally with the color of the car.

DESCRIPTION OF THE DRAWINGS

FIG. 1 is a fragmentary prospective view of a convertible top car to which the invention may be applied.

FIG. 2 is a fragmentary perspective view of a convertible hard car embodying the invention.

FIG. 3 is a partly diagrammatic side view showing the hard top being applied.

FIG. 4 is a front perspective view of the hard top.

FIG. 5 is a fragmentary sectional view along the line of 5—5 in FIG. 2.

FIG. 6 is a fragmentary perspective view showing the attachment of the hard top and the soft top to the windshield header.

FIG. 7 is a fragmentary perspective view of the flanges utilized on the front edge of the hard top.

FIG. 8 is a fragmentary sectional perspective view of the hard top.

FIG. 9 is a fragmentary sectional view showing the rear of the hard top during application.

FIG. 10 is similar to FIG. 9 showing the hard top in position over the erected convertible top.

FIG. 11 is a rear perspective view showing the hard top applied over a convertible top.

FIG. 12 is a perspective view of the hard top.

FIG. 13 is a fragmentary sectional view taking along the line 13≧13 in FIG. 12.

FIG. 14 is a fragmentary view taken along the line 14—14 in FIG. 13.

FIG. 15 is a fragmentary sectional view on an enlarged scale taken along the lines 15—15 in FIG. 12.

BRIEF DESCRIPTION OF THE PREFERRED EMBODIMENT

Referring to FIG. 1, the invention relates to cars having a convertible top T that is supported by conventional linkage so that it can be an upper of extended position, known as the up position or a lower or retracted position, known as the down position. The top is fastened along the rear wall and the sides and releasably latched by well known latches at its front edge to the windshield pillar 20.

The combined hard top and convertible top car comprises a plastic cap H having the configuration of the convertible top T when the top T is in an up or elevated position and overlying the convertible top T. Cap H comprises an integral top wall 21, a rear wall 22 and side walls 23. The cap H includes front flanges or hooks 24 attached along the front edge of the top wall 21 which engage under the front edge of the convertible top T, a rear flange or hook 25 attached along the rear wall 22 which engage under the front edge of the car body adjacent the rear wall of the convertible top C and side flanges or hooks 26 attached along the side walls 23 that engage the sides of the car body. The hard top is preferably made by compression molding plastic and glass fibers to form a top with the final desired shape and with a finish comparable to that of the remainder of the car so that it can be painted and baked, if desired, to conform with the finish of the car and, optionally with the color of the car.

The car top H is applied by the successive steps of releasing the latches which engage the front edge of the convertible top C from its point of attachment to the windshield header of the car, setting the hard top in place, positioning the rear flange 25 below the front edge of the car body, engaging the front flanges 24 under the front portion of the convertible top T, reengaging and latching the front edge of the convertible top T to the windshield header thereby stretching the convertible top to its up position and causing the rear flanges 25 on the hard top H to engage under a portion of the car body, and thereafter simultaneously pushing inwardly on the side walls of the hard top H to engage the side flanges 26 under side moldings of the car.

Referring specifically to FIGS. 3, 4, 8 and 12, the hard top H comprises the top wall 21, rear wall 22 and a opposed side walls 23. The spaced flanges 24 (FIG. 7) are mounted on the front edge of the top wall 21 and extend rearwardly. The rear flange 25 extends from the lower edge of the rear wall 22 rearwardly. Side flanges 26 extend downwardly from the lower edge of each side wall 23. Each flange 26 preferably includes an offset portion 27 extending downwardly and an opening 28 therein, for purposes presently to be described. The top H is also provided with a resilient foam seal strip 29 that extends along the inner surface of the forward edge of the side walls 23, side edge walls 30 of the top wall 21 and front edge wall 31 of the top wall 21 (FIGS. 4, 5 and 8). The hard top H further includes an opening 32 surround by a inwardly extending flange 33 which is adapted to engage the rear window 34 on the convertible top T.

The car top H is applied by the successive steps of:
1. Releasing the front edge of the convertible top C from its point of attachment to the windshield header 35 of the car (FIG. 1),
2. Setting the hard top H in place,
3. Positioning the rear flange 25 below the front edge (FIG. 9) of the car body,
4. Engaging the front flanges 24 under the front portion of the convertible top,
5. Reengaging and latching the front edge of the convertible top C to the windshield header 31 thereby stretching the convertible top to its up position and causing the rear flange 25 on the hard top H to engage under a portion of the car body (FIGS. 10 and 11), and
6. Thereafter simultaneously pushing inwardly on the side walls 23 of the hard top H to engage the side flanges 26 under side moldings 36 of the car.

It can thus be seen that there has been provided a combined hard top and convertible car top wherein the hard top overlies the convertible top in an erected position and; wherein the same mechanism that locks the convertible top in place also locks the hard top in place; which arrangement is relatively low in cost; which provides minimum noise as in the case of a completely closed car; and which is readily adaptable to various types of convertible cars.

I claim:

1. A combination cap and convertible top for a car having a windshield, sides, and a rear wall having a front edge, said combination comprising
    said convertible top having a front edge and a rear wall, and
    said cap having a configuration of the convertible top when the convertible top is in an up or elevated position and adapted to overlie the convertible top,
    said cap comprising a top wall having a front edge, a rear wall, and side walls;
    said cap further including a front flange means fixed along a front edge of the top wall and extending rearwardly of the cap and engaging under the front edge of the convertible top,
    rear flange means fixed along the rear wall of the cap, extending rearwardly of the cap and engaging under the rear wall of the car adjacent the rear wall of the convertible top,
    side flange means fixed along the side walls of the cap that engage the sides of the car,
    said cap being adapted to be applied by the successive steps of releasing the front edge of the convertible top from a point thereof of attachment to the windshield of the car,
    setting the cap in place,
    positioning the rear flange means below the front edge of the rear wall of the car,
    engaging the front flange means under the front edge of the convertible top,
    reengaging and latching the front edge of the convertible top to the windshield thereby causing the convertible top to be stretched to the up position thereof and the rear flange means on the cap to engage under a portion of the car, and
    thereafter simultaneously pushing inwardly on the side walls of the cap to engage the side flange means under side moldings of the car.

2. A method of making a combined cap and convertible top for a car having a windshield, sides and a rear wall having a front edge, said method comprising
    providing said convertible top having a front edge and a rear wall,
    forming said cap having the configuration of said convertible top when the convertible top is in an up or elevated position and overlies the convertible top, said cap comprising a top wall, a rear wall, and side walls,
    providing front flange means fixed along a front edge of the top wall and extending rearwardly of the cap adapted to engage under the front edge of the convertible top,
    providing rear flange means fixed along the rear wall of the cap and extending rearwardly of the cap and adapted to engage under the front edge of the car adjacent the rear wall of the convertible top,
    providing side flange means fixed along the side walls and extending downwardly of the cap that are adapted to engage sides of the car,
    releasing the front edge of the convertible top from a point thereof of attachment to the windshield of the car,
    setting the cap in place,
    positioning the rear flange means of the cap below the front edge of the rear wall of the car,
    engaging the front flange means of the cap under the front edge of the convertible top,
    reengaging and latching the front edge of the convertible top to the windshield thereby causing the convertible top to be stretched to the up position thereof and the rear flange means on the cap to engage under a portion of the car, and
    thereafter simultaneously pushing inwardly on the side walls of the cap to engage the side flange means under side moldings of the car.

* * * * *